Oct. 26, 1965    A. WRIGLEY    3,213,957
SELF-PROPELLED WHEEL CHAIR
Filed Aug. 27, 1962    2 Sheets-Sheet 1
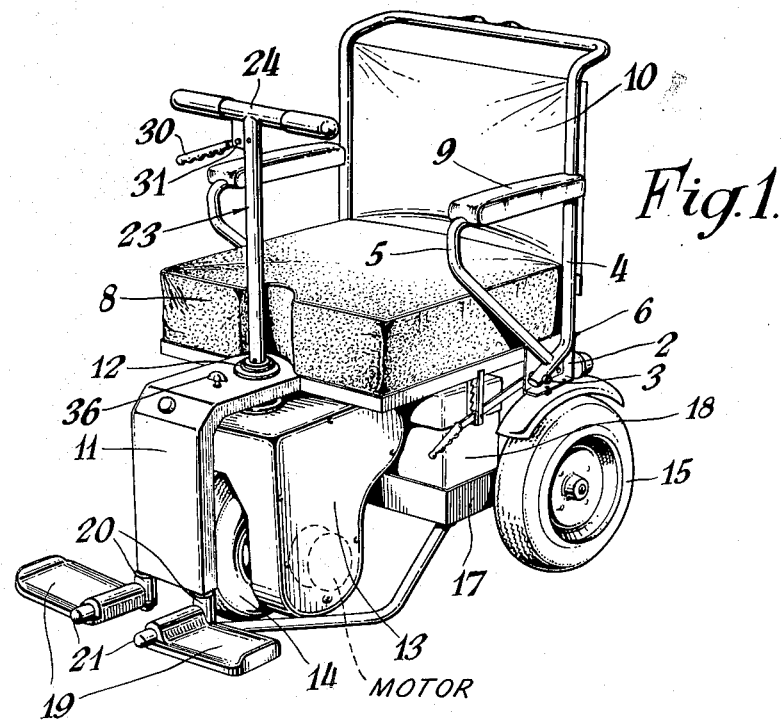
ARTHUR WRIGLEY
INVENTOR
BY
DEAN, FAIRBANK & HIRSCH
ATTORNEYS Oct. 26, 1965  A. WRIGLEY  3,213,957
SELF-PROPELLED WHEEL CHAIR
Filed Aug. 27, 1962  2 Sheets-Sheet 2
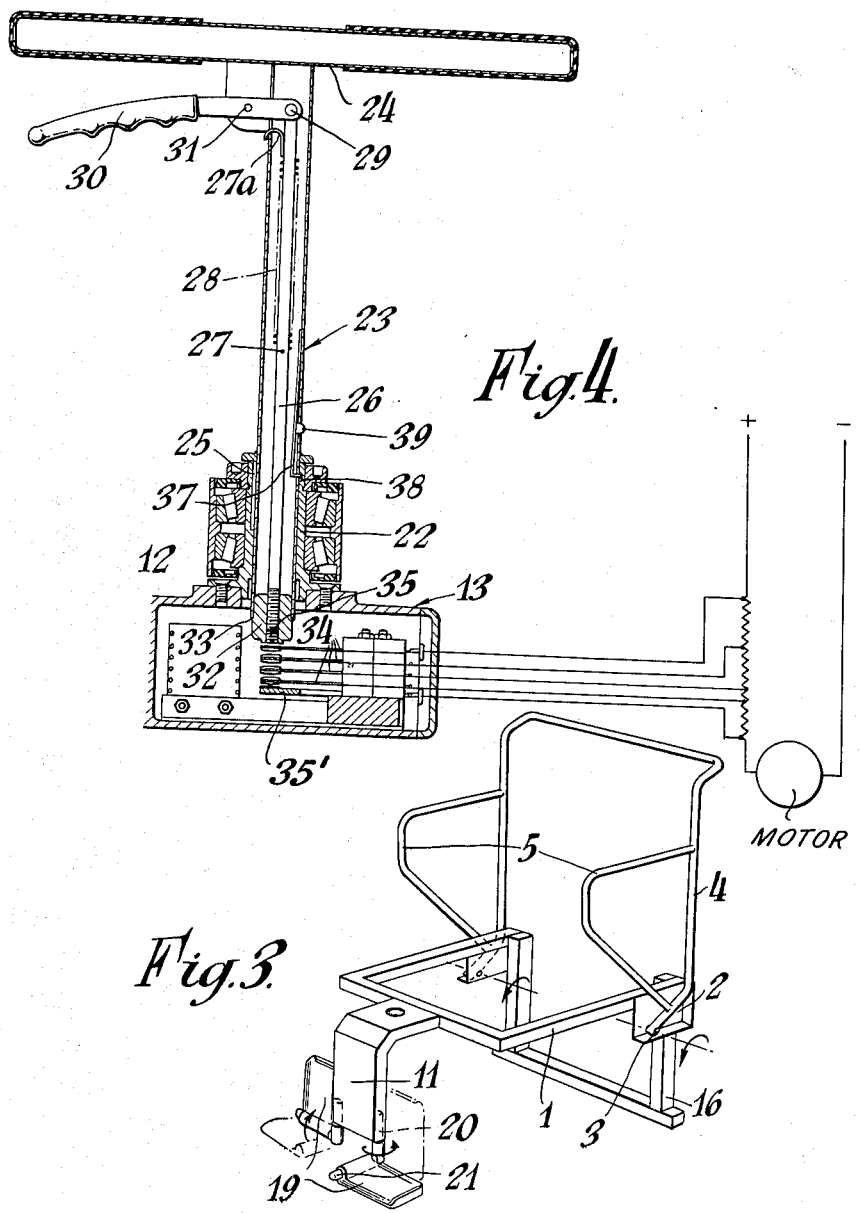
ARTHUR WRIGLEY
INVENTOR
BY
DEAN, FAIRBANKS HIRSCH
ATTORNEYS 3,213,957
SELF-PROPELLED WHEEL CHAIR
Arthur Wrigley, Poole, Dorset, England, assignor to Wessex Industries (Poole) Limited, Poole, Dorset, England
Filed Aug. 27, 1962, Ser. No. 219,517
1 Claim. (Cl. 180—26)

This invention relates to vehicles and particularly to invalid carriages.

An object of the invention is applied to invalid carriages is to enable such a carriage to be folded for easy transport, for example in the boot of a motor car.

According to one feature of the invention an invalid carriage includes a seat supporting frame carrying a back rest supporting frame fitted with arm rests, the back rest supporting frame being pivoted to the seat supporting frame so that the back rest supporting frame together with the arm rests can be folded forwardly to reduce the overall height, the back rest supporting frame preferably being movable into a position in which both frame members lie in a common horizontal plane.

According to a further feature of the invention the seat supporting frame carries a pair of foot rests, each foot rest being carried by the horizontal limb of an L shaped support, and mounted for pivotal movement from its normal horizontal position to a vertical position, the vertical limb of the L shaped support being also capable of pivotal movement about its axis into a position in which both foot rests lie parallel with the front edge of the seat supporting frame, thus decreasing the length of the chair for stowage.

According to a further feature of the invention applicable to vehicles generally, but particularly applicable to invalid carriages, the vehicle is provided with a combined steering column and handle bar incorporating a lever type speed control, the steering column and handle bar being bodily removable in a simple manner. Such an arrangement enables the combined steering column and handle bar to be placed in position when an invalid is seated in the carriage thus facilitating ingress and egress to a remarkable degree.

The speed control, takes the form of a rod lying axially within the steering column and displaceable axially therein as a result of pivotal movement of the lever, the rod preferably progressively closing a series of electric contacts controlling the rotational speed of an electric motor driving the carriage.

Referring to the accompanying drawings:

FIGURE 1 is a perspective view of an invalid chair in accordance with the invention;

FIGURE 2 is a perspective view of the chair folded;

FIGURE 3 is a perspective view of the chassis and its associated pivoted back rest and arm rests unit; and FIGURE 4 is a sectional view showing the detachable steering column and handle bar.

In a preferred embodiment of the invention the invalid carriage includes a seat supporting frame 1 composed of channel or angle section metal or tubing, the frame being of substantially U shape, the limbs at their extremities carrying pressed metal brackets 2 to which is pivoted at 3 a substantially inverted U shaped back rest supporting frame 4, bent up from tubing and carrying welded on arm rest supports 5.

The frame 4 is capable of forward hinging movement through substantially 90° into the position shown in FIGURE 2 in which position both frame members 1 and 4 lie in substantially the same plane.

The frame 4 is held normally in its operative position shown in FIGURES 1 and 3 by wing nut carrying screws 6 passing through holes or slots 7 in the brackets 2.

The frame 1 carries a seat 8 and the members 5 are fitted with resilient arm rests 9. The frame 4 carries a back rest 10.

The frame 1 carries at its leading edge an L shaped extension 11 carrying a bearing 12 for a vertically positioned tubular spindle fixed to a steerable propulsion unit 13 carrying a road wheel 14 and also an electric motor adapted to drive the road wheel through suitable reduction gearing.

The chair is provided with a pair of laterally spaced rear wheels 15 mounted on stub axles carried by a sub-frame 16 secured to the rear end of frame 1.

The sub-frame 16 carries a tray-like platform 17 for an electric battery 18 supplying electric current to the driving motor, the sub-frame including forwardly directed tubular side members 16a which are connected at their leading ends to the part 11.

The L shaped part 11 carries a pair of foot rests 19 hinged about vertical and horizontal axes 20 and 21 whereby they can be moved from the operative position shown in FIGURE 1 to the inoperative position shown in FIGURE 2 in which position the foot-rests extend upwardly and do not project forwardly of the part 11.

The arm rests may be removable, collapsible or hinged to permit easy entry and egress to or from the invalid carriage, whilst the foot rests may be adjustable vertically or otherwise to suit the length of leg of the invalid.

The vertically positioned tubular spindle 22 of the propulsion unit 13 has a splined connection 25 with a detachable T shaped steering column 23 incorporating a handle-bar 24. The steering column contains a control rod 26 carrying a coiled tension spring 28 anchored to the control rod at 27 and to the column at 27a, the control rod being connected at 29 to a hand operable control lever 30 pivoted at 31 by which lever the control rod can be moved downwardly against the action of the spring 28.

A block 32 of electrically insulating material is screwed to the lower end of the control rod, the block being slidable within the lower end of the steering column and provided with a shoulder 33 which by its engagement with the lower end of the steering column limits upward movement of the block and its associated control rod.

The block as a result of downward movement of the control rod under the action of the lever 30 engages the uppermost contact of a series of spring contacts 34 and a fixed contact 35' whereby the contacts will be progressively closed as the control rod moves downwardly whereby a resistance in the electrical circuit will be progressively short circuited thereby progressively increasing the speed of rotation of the driving motor.

The block 32 is adjustable lengthwise of the control rod, a locking screw 35 being provided for locking the block in its adjusted position.

Alternatively the block may be of metal in which case the uppermost contact 34 will be insulated on its upper surface where it engages the block or other metal part associated with the control rod.

It will be appreciated therefore that the speed of the invalid carriage will be determined by the amount of lever movement and that should the invalid release his grasp on the control lever the spring will return the control rod to the position shown in FIGURE 4 in which position the electrical connection with the driving motor will be broken.

Although the above described method of controlling the speed of rotation of the motor is preferred it is within the scope of the invention to employ alternative methods such as for example battery tapping, carbon pile, a controlled rectifier, or an interrupter set.

Forward or reverse movement of the invalid carriage is preferably controlled by a forward and reverse switch 36 shown in FIGURE 1.

To prevent accidental withdrawal of the steering column the latter contains a spring loaded claw 37 engageable with an annular groove 38 in the tubular spindle and displaceable from the groove when it is desired to withdraw the column by a finger operable push-button 39.

It will be appreciated therefore that with the above arrangement the rotational speed of the driving motor can be adequately controlled without the necessity for electric wires passing through the steering column to the handle bar, the arrangement enabling the combined handle bar and steering column to be easily removed and replaced.

It is preferred that the carriage in addition to carrying a suitable electric battery shall also carry a charger and consequently the battery can be easily recharged at any point of supply of alternating current.

The invalid carriage when folded into the position shown in FIGURE 2 will occupy a small space and can be easily carried in the boot of a motor vehicle.

I claim:

A self propelled wheel chair comprising a seat supporting frame, a pair of rear wheels, a housing rigidly secured to said seat supporting frame and extending forwardly thereof, a front wheel in said housing rotatably mounted to permit steering movement thereof, a drive motor in said housing for effecting rotation of said wheel on a horizontal axis to drive said wheel chair, a back rest supporting frame, arm rests rigidly secured to the back rest supporting frame, a pivot connection between the back rest supporting frame and the seat supporting frame permitting hinging of the back rest supporting frame forwardly with respect to the seat rest supporting frame from a vertical position into a position in which said back rest supporting frame lies parallel with said seat supporting frame when not in use, a vertically positioned steering column extending into said housing and adapted to be releasably connected at its lower end to said front wheel and having a handle bar at its upper end, said steering column being positioned in front of said seat and centrally located with respect thereto and removable for access to said chair, a battery supporting frame positioned beneath said seat supporting frame, switch means to control said electric motor, means electrically connecting the battery carried by said battery supporting frame through said switch means to said electric motor, said steering column having a control rod extending centrally therethrough, the lower end of said control rod adapted releasably to engage said switch means to actuate the latter, a control lever pivotally mounted to said column adjacent the handle bar and operably connected to said control rod for actuation thereof and a latch mechanism removably to secure said steering column in operable position.

References Cited by the Examiner

UNITED STATES PATENTS

| | | | |
|---|---|---|---|
| 1,006,427 | 10/11 | Boraks | 287—58 |
| 1,245,264 | 11/17 | Peck | 200—61.54 |
| 2,209,356 | 7/40 | Schreck | 180—13 |
| 2,325,396 | 7/43 | Hastings | 180—13 |
| 2,495,573 | 1/50 | Duke. | |
| 2,586,273 | 2/52 | Steven | 180—77 |
| 2,588,664 | 3/52 | Schreck | 180—65 |
| 2,598,985 | 6/52 | Everest et al. | 297—433 |
| 2,713,891 | 7/55 | Linquist | 297—379 |
| 2,879,858 | 3/59 | Thomas | 180—65 X |
| 2,892,506 | 6/59 | Slater | 180—26 |
| 3,042,132 | 7/62 | Bouffort | 280—278 |

FOREIGN PATENTS 632,143  7/36  Germany.

MILTON BUCHLER, *Primary Examiner*.

PHILIP ARNOLD, KENNETH H. BETTS, A. HARRY LEVY, *Examiners*.